April 4, 1933. E. E. BEARD 1,903,329
METHOD OF PRODUCING LINOTYPE PELLETS FROM LINOTYPE SLUGS
Filed Nov. 21, 1929 2 Sheets-Sheet 1

Inventor
Elmer E. Beard
By
Attorney

April 4, 1933. E. E. BEARD 1,903,329
METHOD OF PRODUCING LINOTYPE PELLETS FROM LINOTYPE SLUGS
Filed Nov. 21, 1929   2 Sheets-Sheet 2
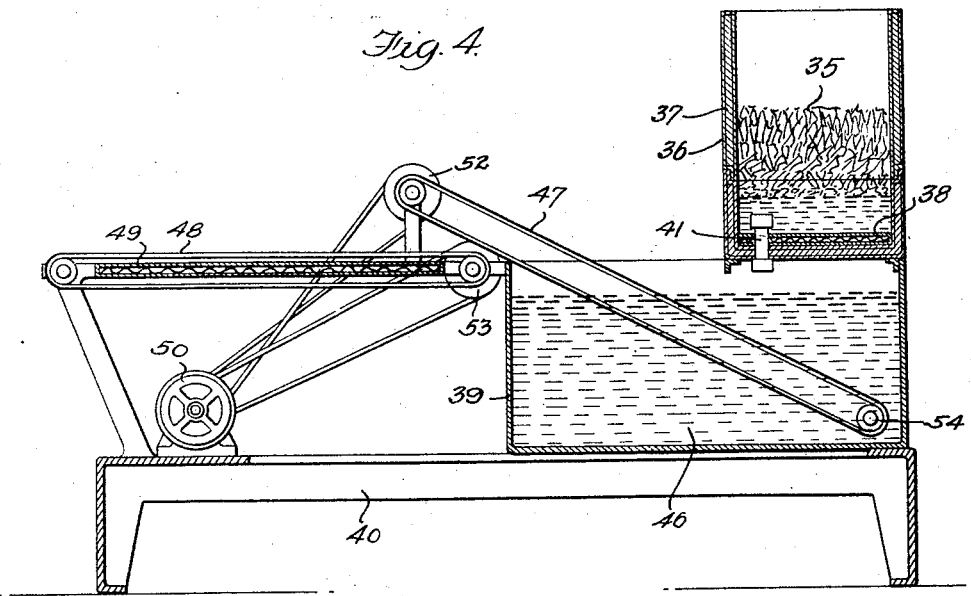
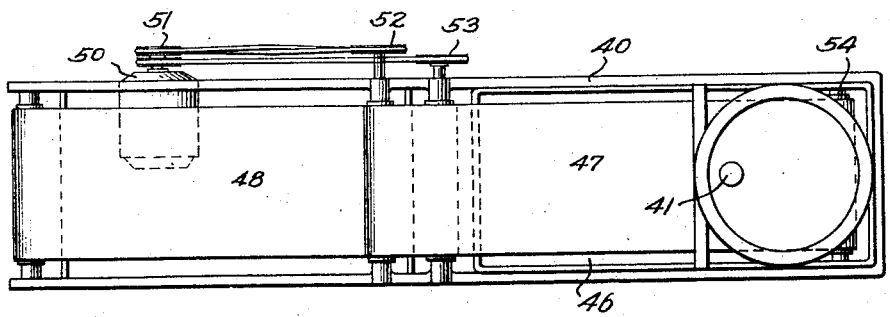
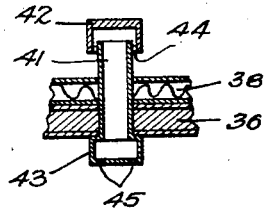

Patented Apr. 4, 1933

1,903,329

UNITED STATES PATENT OFFICE

ELMER E. BEARD, OF OLYMPIA, WASHINGTON

METHOD OF PRODUCING LINOTYPE PELLETS FROM LINOTYPE SLUGS

Application filed November 21, 1929. Serial No. 408,775.

As is well known, the old linotype "slugs" made by linotype machines are melted up and cast into "pigs". These pigs take on various shapes and are fed into the melting pot of the linotype machine and the metal reused. There are a number of systems for feeding these pigs into the melting pot, but the objection to them lies in the fact that they putter up, and cover up the mechanism in the linotype pot, and all of them have to be removed before the operator can take the plunger out of the pot for the purpose of cleaning it.

One of the objects of my invention is to convert the linotype metal slugs into relatively small particles, which by suitable mechanism may be automatically fed to the melting pot on the linotype machine, keeping a constant level of the molten metal in said pot at all times while the machine is in operation.

Another object of my invention is to provide a method whereby linotype slugs may be easily, conveniently and rapidly remelted and formed into pellets or "shot", which may be fed in number desired to a linotype melting pot to keep the metal in the pot at an exact working level through a closed course, whereby the pellets or shot will be protected from the oxidizing action of the atmosphere.

Still another object of the invention is to provide a method of melting linotype slugs whereby the slugs may be melted and shot formed therefrom without oxidation of the metal or danger of its separation into its constituent metals.

Still another object of the invention is to provide a method of making pellets or shot whereby the pellets at the time of formation will be coated with a non-metallic covering to protect the pellets from the oxidizing influences of the atmosphere during storage or other periods and until supplied for use to a linotype machine, and which will further assist in preventing oxidation of the metal during its feeding and melting actions.

Still another object of the invention is to provide a method of melting linotype slugs and producing pellets or shot therefrom which may be carried out by means of an apparatus of simple type and of such compact form as to be readily housed and operated in any ordinary printing establishment.

In the drawings:

Fig. 4 is a vertical longitudinal section of a shot forming machine such as may be employed for carrying out my process.

Fig. 5 is a top plan view of the same.

Fig. 6 is a sectional view through the bottom of the melting pot of the shot forming machine and the dropper device.

Fig. 7 is a cross-section through the tube of the dropper device looking toward the bottom of its indicating cap.

Fig. 8 is a bottom plan view of the discharge cap or nozzle of the dropper device.

Figure 1:
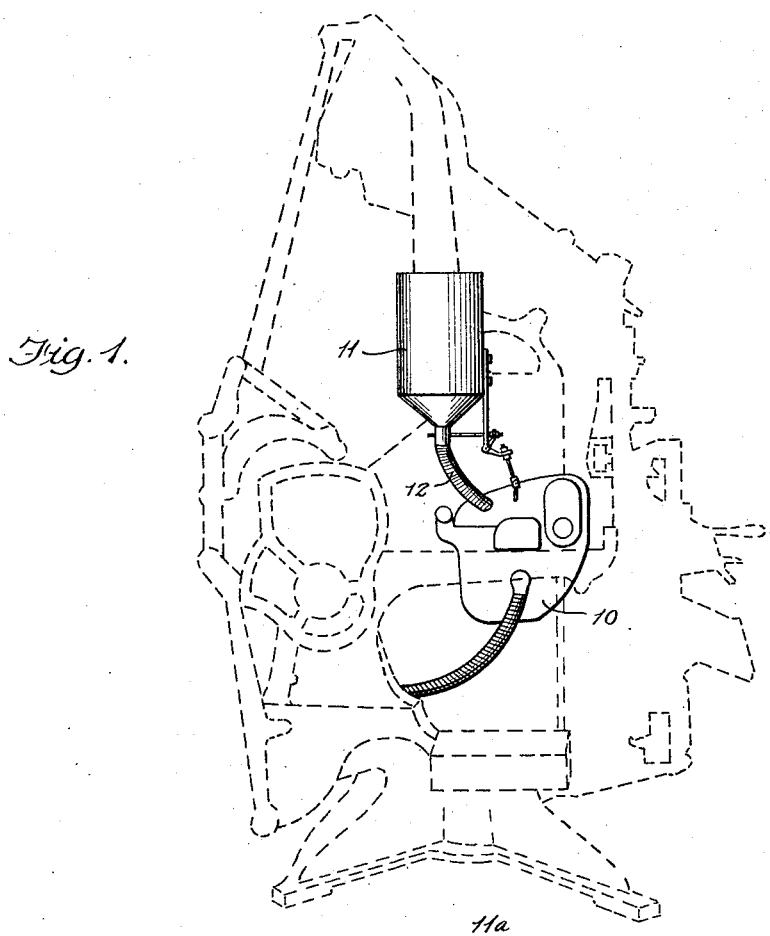
Fig. 1 is an outline view of a linotype machine showing the application thereto of a type of feeder for supplying the linotype machine with pellets or shot made according to my process.
Figure 3:
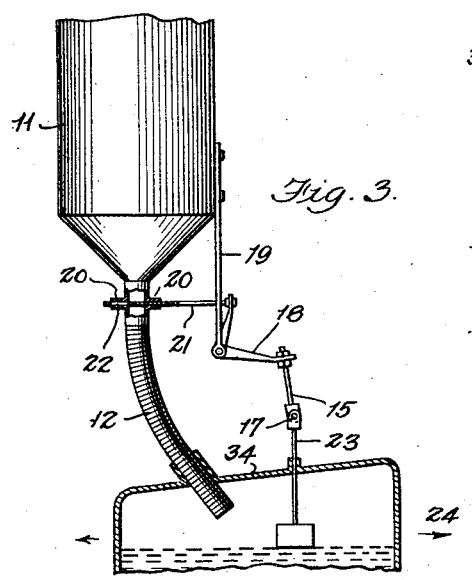
Fig. 3 is a detail side elevation, with parts in section, of the apparatus shown in Fig. 1.
Figure 2:
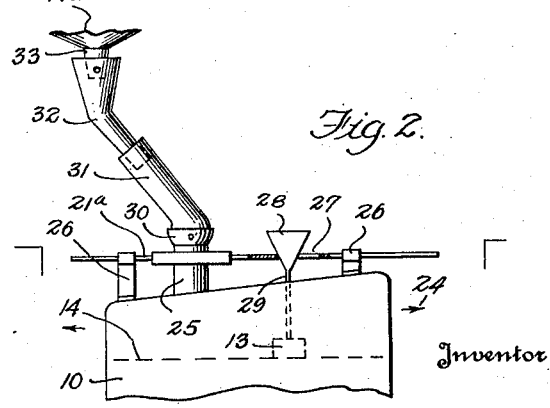
Fig. 2 is a side elevation of the upper part of the melting pot of a linotype machine showing applied thereto a modified form of the apparatus illustrated in Figs. 1 and 3.

Referring to Figures 1, 2 and 3, the reference number 9 designates a commercial linotype machine, in outline. My improved attachment adapting the usual rocking, i. e., forwardly and backwardly moving, linotype melting pot 10, for using the metal in shot or small particle form consists of a reservoir 11, adapted to be filled en masse with shot. Let it be understood that the term "shot" includes metal in small particles and of any desired shape that will permit it to feed automatically.

These shot flow, when permitted, from the reservoir 11 through a reduced outlet at the bottom thereof and through a flexible tube 12 into the linotype pot 10. The flow of the metal into the pot is regulated by a float 13, which float is regulated in height by the supply of molten metal in the pot 10, the level of which is indicated by the dotted line 14 in Figure 2. The arrows in this figure indicate the backward and forward movement of the pot 10 in the normal operation of the linotype.

The float 13 is connected to a rod 15 by a pivoted joint 17, said rod 15 being connected by a loose joint to a crank lever 18 which is mounted on a bracket 19. The reduced end of the reservoir 11 or the conduit 12 of which said outlet may be said to constitute a part is provided with bearings 20 in which a valve 21 is slidably mounted, said valve having an aperture 22 therethrough of the same diameter as the conduit 12, so that as the float 13 descends as the metal from pot 10 is used, the rod 15, and bell crank 18 are operated to move the valve from its position shown in Figure 3 until its aperture 22 registers with the conduit 12, whereupon the shot in reservoir 11 are free to feed through the conduit into the melting pot 10. It will be noted that the rod 15 and the rod 23 of the float stand at an angle, thus when the melting pot 10 moves forward to arrow 24 in the casting of the slug it operates the valve 21 through crank lever 18. Suitable adjustments are provided between the float 13 and the valve 21. It is essential that the angularity between the rods 15 and 23 be such that the movement of the pot 10 back and forth in making the casting of linotype slug operates the valve 21. Thus the float merely fixes the amount of opening that the valve makes, thus regulating the amount of shot fed to the pot 10. Several expedients may be used in this connection, one of which I have illustrated in Figure 2, in which the valve 21a is positioned in the conduit 25 and mounted in suitable supports 26; said valve being provided with an elongated slot 27 in which the inverted conical head 28 is positioned, said head being on the float rod 29; the conical head cooperating with the slot 27 gives movement to the valve. By the movement of the linotype pot 10 a small amount of shot, necessary to keep the molten metal to a constant level, is delivered with each casting of a linotype slug in the operation of the linotype.

Again referring to Figure 2, the conduit 25 has a bell or flared mouth 30 in which one end of the pipe 31 is hinged or pivoted; a pipe or conduit 32 is hinged to a discharge spout 33 of the shot reservoir 11a, the lower end of this pipe 32 telescopes within the upper end of the pipe 31 thus forming a flexible conduit for the passage of the shot from the reservoir to the pot. It is preferable to have the reservoir of shot near to the heat of the melting pot. From the above it will be seen that one of the salient features of my invention resides in feeding metal in "shot" form to a melting pot of the linotype machine through a flexible conduit in order that the conduit may flex with the movements of the melting pot.

Another salient feature of my invention is that I am enabled, by the closed top 34 of the pot 10 and the connection of the "shot" feed thereto, i. e., by the use of a sealed pot and feed tube, to exclude air from the molten metal in the pot.

Also, by providing the shot when formed with a suitable protective coating the shot may be protected from oxidation during any period between its formation and time of supply to the melting pot of the linotype machine, and during its feed to such pot, by means of which the amount of formed dross may be reduced to the minimum.

Now referring to Figures 4 to 8 wherein I have a machine for converting the "slugs" or linotype into "shot", it will, of course, be understood that the details of construction are merely illustrative and I do not wish to limit myself to them.

In the operation of this "shot" forming machine, "slugs" or linotype 35 are thrown into the melting pot 36 which has insulation 37 in its walls, and is provided with a false bottom 38, under which is placed a heating element or medium. Beneath this pot 36 is a water tank 39 supported on the bench 40. The pot 36 is provided with a molten metal dropper device 41 which consists of a tube having an intake cap or nozzle 42 secured to its upper open end, and a discharge cap or nozzle 43 secured to its lower open end. Ports 44 are formed through the lower wall of the cap 42 outside of the port 41, as clearly shown in Figures 6 and 7, while the cap is provided with a series of exit ports 45, preferably disposed in a circle.

The molten metal from the pot 36 flows through the ports 44 into the port 41, thence into the cap 43, the weight of the metal in pot 36 being such that the molten metal is extruded through the ports 45 from which it falls into the water 46 and the metal is formed into "shot" or small particles, which fall upon the traveling belt 47 and are thus conveyed to traveling belt 48 from which they are discharged into any suitable container. I position a heater 49 under the belt 48 to heat the belt and dry the shot as they pass over it. A suitable motor 50 drives the belts over the respective pulleys 51, 52, 53 and 54.

The advantage of this arrangement of melting metal is many fold. Linotype metal is greatly injured if the heat rises much above 550 degrees Fahrenheit. It is also a well known fact that where linotype metal is melted in a large quantity in a large kettle or melting pot, it tends to separate, the lead being heavier than the antimony and tin, tends to fall or settle to the bottom, while the other ingredients assume their places in the mixture according to their specific gravities. Thus the metal becomes damaged, for the mixture must be homogeneous all the way through, or it will not function satisfactorily in the linotype. In the various melting pots used for remelting the used linotype slugs devices are placed, or instructions given, to keep the metal in agitation and well mixed while it is being dipped in the molten state, or poured into pigs to be used again in the linotype. In this common system the surface of the hot metal is exposed to the air and, of course, oxidation takes place very rapidly, forming dross, which amounts to about two percent loss in the ordinary newspaper office, and much more where inexperienced boys do the melting of the linotype slugs.

By my process of remelting the linotype slugs I turn them into "shot" instead of pigs. I fill melting pot 36 to the top with the old used slugs. The current is immediately switched on to the electrical heating element 38 in the bottom of the pot. The old linotype slugs immediately begin to melt when they come into contact with this element at a temperature above but close to the melting temperature of the metal. As soon as they melt, the printer's ink, that has been left on the face of them, also melts and is allowed to float to the top of the molten metal, thus providing a thin coating of material that keeps the air away from the molten metal. Dirt and floor sweepings also provide an air proof coating. This process continues until the molten metal has risen about one-half inch in height above the electrical element 38 when it has reached the top of the port 41 and begins to run out through the holes 44 and coming out through the ports 45 in the form of "shot", or drops falling into the water, thus making a peculiar shaped globule of metal which I call "shot". By this means only a shallow body of metal is present at any time in the pot and subjected for any material period to the action of heat, and this metal flows off or is discharged to and through the dropper as fast as melted, so that the metal can not become overheated or allowed to separate into its component metals before discharge, and the metal is discharged at a temperature suitable for rapid or sudden cooling and hardened into pellets or shot.

It will thus be seen that as fast as the metal melts it runs out, and is hardened and becomes "shot", and is carried away by the belts to be used in the linotype machine, thus there is no chance for the ingredients to separate themselves. Here I save two very vital things in the remelting of the ingredients, nor is there any chance for the loss of metal through oxidization, as the old ink and dirt in the sweepings from the floor, form an air proof covering over the metal while the good metal runs from the bottom of the cap through the ports 44, right close to the heating element. As the metal melts in the pot and runs out, the old slugs gradually settle down until they are all melted. Of course, they are replenished from time to time until all the old metal about the shop that has accumulated from the day's run is turned into "shot", and the pot allowed to cool, and such old burned printer's ink and dirt as has accumulated is skimmed off and thrown away.

Owing to the fact that the reclaimed metal is melted, as stated, at a temperature above but close to the melting point of the metal, and is caused to flow out of the melting pot and through the dropper device substantially as fast as formed, another material and important advantage is gained, in addition to that of preventing overheating and separation of the metal constituents, in that the discharging drops may be quickly chilled or hardened into slot or pellet formation. By this means a cooling bath of water may be employed and the air gap between the drop forming device and the water bath may be of very restricted depth, and reduced to a depth of a very few inches, thus enabling the entire shot forming apparatus, including the melting pot, cooling bath, dropper device and air gap, to be combined in a very compact form of apparatus of such reduced height that it may be easily arranged and operated in a room of any ordinary printing establishment, thus avoiding the necessity of providing shot towers or other special and lofty devices such as commonly employed in the manufacture of ammunition ordinarily known as "shot", and which towers for obvious reasons are unsuitable for use in the production of pellets or shot from metal of the composition of linotype metal. My method further permits of the use of a pellet or shot making apparatus which may be constructed and operated at a comparatively low cost for the rapid supply of pellets or shot in quantity required for the daily use of one or more linotype or other similar type casting machines.

I have also found that by mixing ordinary flour in water in which the molten metal drops to make the "shot" I get a minute coating of flour all over the "shot". This prevents oxidation of the shot after it is made, and it does not turn black when coming in contact with air, but remains bright until used. I find, too, that this flour or paste covering on the "shot", which stands a heat temperature of around 800 degrees before it burns, puts a thin covering of material over the metal in the linotype pot, which has a heat of 530 to 550 degrees. This protects the metal there from the air to a very great extent, and my dross skimmings from the linotype pot are not more than one-fourth the amount they were before I began to use linotype metal in the "shot" form.

What I claim is:

1. The method of melting used slugs of linotype metal and forming from the molten metal particles of shot-like or pellet form for reuse in the melting pot of the machine, which consists in melting the slugs in a container at a temperature above but close to the melting point of the metal, collecting from the metal the oil and other impurities carried thereby and disposing the same in the form of a coating over the metal to protect the same from oxidation during the melting action, and drawing off the molten metal and discharging drops of the same from the container substantially as rapidly as melted into a cooling bath through an air space of restricted depth so as to effect a rapid cooling and hardening of the drops.

2. The method of melting used slugs of linotype metal and forming from the molten metal particles of shot-like or pellet form for reuse in the melting pot of the machine, which consists in melting the metal in a container at a temperature above but close to the melting point of the metal, discharging drops of the metal from the container substantially as fast as melted into a cooling bath through an air space of restricted depth so as to rapidly cool and harden the drops, and drying the shot so formed and providing the same with a coating of non-metallic material capable of preventing oxidation thereof.

3. The method of melting used slugs of linotype metal and forming from the molten metal particles of shot-like or pellet form for reuse in the melting pot of the machine, which consists in melting the metal in a container at a temperature above but close to the melting point of the metal, drawing off the metal and discharging drops of the same substantially as fast as melted from the container into a cooling bath through an air space of restricted depth so as to effect a rapid cooling and hardening of the drops, drying the shot so formed, transmitting the shot to a receiving reservoir, and protecting the shot from the oxidizing influence of the atmosphere during such melting and transfer operations.

4. The method of melting used slugs of linotype metal and forming from the molten metal particles of shot-like or pellet form for reuse in the melting pot of the machine, which consists in melting the metal in a container at a temperature above but close to the melting point of the metal, drawing off the metal discharging drops of the same substantially as fast as melted from the container into a cooling bath containing a non-metallic coating substance to protect the formed shot from oxidation through an air space of restricted depth, and drying the shot so formed so as to free the shot from moisture while leaving the protective coat thereon.

5. The method of melting used slugs of linotype metal and forming from the molten metal particles of shot-like or pellet form for reuse in the melting pot of the machine, which consists in melting the slugs in a pot at a temperature above but close to the melting point of the metal, maintaining a shallow bath of the molten metal in the pot to which the metal of the melting slugs is added, separating from the metal in the melting action oil or other foreign material and causing the same to float upon the bath and to insulate the same from the atmosphere, withdrawing from the bath the molten metal substantially as fast as formed so as to maintain the level thereof and discharging such metal in the form of drops from the bath, and precipitating the drops through a restricted air gap into a cooling bath so as to cause the drops to suddenly cool and harden into shot.

6. The method of melting used slugs of linotype metal and forming from the molten metal particles of shot-like or pellet form for reuse in the melting pot of the machine, which consists in melting the slugs in a pot at a temperature above but close to the melting point of the metal, maintaining in the pot a shallow bath of the molten metal to which the metal from the melting slugs is constantly added, separating from the melting metal oil and other refuse and disposing the same to form an insulating coating on the surface of the bath, withdrawing from the bath below its surface the molten metal substantially as fast as formed and discharging the same in the form of drops, precipitating the drops through a restricted air gap into a cooling bath to cause the drops to be suddenly cooled and to harden into shot, coating the shot with a nonmetallic oxidation-preventing substance, and drying the shot.

In testimony whereof I affix my signature.

ELMER E. BEARD.